United States Patent
Umada et al.

(10) Patent No.: US 12,415,745 B2
(45) Date of Patent: Sep. 16, 2025

(54) GLASS, CHEMICALLY TEMPERED GLASS, AND METHOD FOR PRODUCING SAME

(71) Applicant: AGC Inc., Tokyo (JP)

(72) Inventors: Takumi Umada, Tokyo (JP); Kenji Imakita, Tokyo (JP); Yusuke Arai, Tokyo (JP); Shingo Urata, Tokyo (JP)

(73) Assignee: AGC INC., Tokyo (JP)

( * ) Notice: Subject to any disclaimer, the term of this patent is extended or adjusted under 35 U.S.C. 154(b) by 976 days.

(21) Appl. No.: 17/515,211

(22) Filed: Oct. 29, 2021

(65) Prior Publication Data

US 2022/0048809 A1    Feb. 17, 2022

Related U.S. Application Data

(63) Continuation of application No. PCT/JP2020/020365, filed on May 22, 2020.

(30) Foreign Application Priority Data

Jun. 3, 2019   (JP) ................. 2019-103869

(51) Int. Cl.
   *C03C 3/097*    (2006.01)
   *C03C 21/00*    (2006.01)

(52) U.S. Cl.
   CPC ............ *C03C 3/097* (2013.01); *C03C 21/002* (2013.01)

(58) Field of Classification Search
   CPC .............................. C03C 21/002; C03C 3/095
   See application file for complete search history.

(56) References Cited

U.S. PATENT DOCUMENTS 5,981,015 A    11/1999  Zou et al.
6,214,429 B1*   4/2001  Zou .................. C03C 3/087
                                                428/913
(Continued)

FOREIGN PATENT DOCUMENTS

CN    108473370 A    8/2018
JP    H10-79122 A    3/1998
(Continued)

OTHER PUBLICATIONS

International Searching Authority, "International Search Report," issued in connection with International Patent Application No. PCT/JP2020/020365, dated Aug. 18, 2020.
(Continued)

*Primary Examiner* — Matthew E. Hoban
(74) *Attorney, Agent, or Firm* — Foley & Lardner LLP

(57) ABSTRACT

The present invention relates to a glass including, in mole percentage in terms of oxides: 40-65% of $SiO_2$; 25-40% of $Al_2O_3$; and 7-15% of one or more components, in total, selected from $Y_2O_3$, $La_2O_3$, $Nb_2O_5$, $Ta_2O_5$, and $WO_3$. Also the present invention relates to a chemically strengthened glass having a base composition including, in mole percentage in terms of oxides: 40-65% of $SiO_2$; 25-40% of $Al_2O_3$; 7-15% of $Y_2O_3$; and 2-15% of $Li_2O$, and having a compressive stress value, measured at a depth of 50 μm from a surface thereof, of 150 MPa or more.

9 Claims, 2 Drawing Sheets

(56) References Cited

U.S. PATENT DOCUMENTS

| | | | |
|---|---|---|---|
| 2012/0052271 A1 | 3/2012 | Gomez et al. | |
| 2014/0141226 A1* | 5/2014 | Bookbinder | C03C 21/002 |
| | | | 501/64 |
| 2015/0030840 A1 | 1/2015 | Gomez et al. | |
| 2016/0102011 A1* | 4/2016 | Hu | C03C 10/0027 |
| | | | 428/155 |
| 2018/0186685 A1 | 7/2018 | Murayama et al. | |
| 2018/0265397 A1 | 9/2018 | Murayama et al. | |
| 2018/0319706 A1 | 11/2018 | Murayama et al. | |
| 2018/0327304 A1 | 11/2018 | Murayama et al. | |
| 2019/0084869 A1* | 3/2019 | Luo | C03C 3/062 |
| 2019/0194057 A1 | 6/2019 | Murayama et al. | |
| 2019/0202730 A1 | 7/2019 | Gomez et al. | |
| 2019/0263713 A1 | 8/2019 | Murayama et al. | |
| 2019/0292099 A1 | 9/2019 | Murayama et al. | |
| 2020/0131086 A1 | 4/2020 | Koike et al. | |
| 2021/0053867 A1 | 2/2021 | Murayama et al. | |
| 2022/0274869 A1 | 9/2022 | Murayama et al. | |

FOREIGN PATENT DOCUMENTS

| | | | |
|---|---|---|---|
| JP | 2000-159540 A | | 6/2000 |
| JP | 2007-031196 A | | 2/2007 |
| JP | 2007-161944 A | | 6/2007 |
| JP | 2013-536155 A | | 9/2013 |
| JP | 2016-050155 A | | 4/2016 |
| WO | WO200204371 | * | 7/2000 |
| WO | WO-2018/199046 A1 | | 11/2018 |
| WO | WO-2019/009069 A1 | | 1/2019 |

OTHER PUBLICATIONS

International Searching Authority, "Written Opinion," issued in connection with International Patent Application No. PCT/JP2020/020365, dated Aug. 18, 2020.

* cited by examiner

GLASS, CHEMICALLY TEMPERED GLASS, AND METHOD FOR PRODUCING SAME

CROSS-REFERENCE TO RELATED APPLICATIONS

This is a bypass continuation of International Patent Application No. PCT/JP2020/020365, filed on May 22, 2020, which claims priority to Japanese Patent Application No. 2019-103869, filed on Jun. 3, 2019. The contents of these applications are hereby incorporated by reference in their entireties.

TECHNICAL FIELD

The present invention relates to a glass, more particularly, a high-strength glass, and to a chemically strengthened glass and a method of manufacturing the same.

BACKGROUND ART

Fracture toughness value is one of important indexes for evaluating glass strength, but it is not easy to improve the fracture toughness of a glass. For example, Patent Document 1 discloses a glass having a very high fracture toughness value. However, this glass is configured of two components, $Al_2O_3$ and $SiO_2$, and has a high $Al_2O_3$ content, and thus production thereof by ordinary glass production methods encounters difficulties in vitrification because crystal precipitation occurs at the interface between the melt and the container used for the melting.

Known as a method of enhancing the strength of an ordinary glass is chemical strengthening. For example, Patent Document 2 discloses a method in which a two-stage chemical strengthening treatment is given to an aluminosilicate glass containing lithium, thereby obtaining a chemically strengthened glass having a high surface strength and a large depth of a compressive stress layer.

In chemically strengthened glasses, the larger the surface compressive stress value and depth of a compressive stress layer, the higher the strength. Meanwhile, the formation of a compressive stress layer in the surface results in internal tensile stress within the glass in accordance with the sum of the compressive stress. In cases when the value of internal tensile stress (CT) exceeds a threshold value, the glass comes to break vigorously when broken. The threshold value is also called a CT limit.

Ordinary glasses are not so high in CT limit and hence have limitations in strength enhancement by chemical strengthening.

CITATION LIST

Patent Literature

Patent Document 1: JP-A-2016-50155
Patent Document 2: JP-T-2013-536155 (The term "JP-T" as used herein means a published Japanese translation of a PCT patent application.)

SUMMARY OF INVENTION

Technical Problem

Glasses having a high fracture toughness value, such as that described in Patent Document 1, are difficult to produce and impracticable unless the glasses have a devitrification temperature of 1,500° C. or less. Accordingly, the present invention provides a glass which has a high fracture toughness value and is easy to produce. Another object of the present invention is to provide a glass stably having higher strength than conventional glasses.

Solution to the Problem

The present inventors made investigations on a method of lowering the devitrification temperature of a glass having a high fracture toughness value to make the glass easy to produce. As a result, the inventors have discovered that it is effective to add a cation component having a large valence and a small ionic radius to a glass composition. The present invention has been thus completed.

The present invention provides a glass including, in mole percentage in terms of oxides:
  40-65% of $SiO_2$;
  25-40% of $Al_2O_3$; and
  7-15% of one or more components, in total, selected from $Y_2O_3$, $La_2O_3$, $Nb_2O_5$, $Ta_2O_5$, and $WO_3$.

The glass of the present invention may include $Y_2O_3$ in an amount of 5-15%.

The glass of the present invention may have a ratio $([Y_2O_3]+[La_2O_3]+[Nb_2O_5]+[Ta_2O_5]+[WO_3])/[Al_2O_3]$ of the total content of $Y_2O_3$, $La_2O_3$, $Nb_2O_5$, $Ta_2O_5$, and $WO_3$ to the content of $Al_2O_3$ of 0.2-0.6.

The glass of the present invention preferably includes $Li_2O$ in an amount of 2-15%.

The glass of the present invention preferably has a fracture toughness value of 0.93 $MPa \cdot m^{1/2}$ or more.

Furthermore, the glass of the present invention preferably has a devitrification temperature of 1,500° C. or less.

The present invention further provides a method of manufacturing a chemically strengthened glass, the method including chemically strengthening a glass for chemical strengthening which includes, in mole percentage in terms of oxides:
  40-65% of $SiO_2$;
  25-40% of $Al_2O_3$;
  7-15% of $Y_2O_3$; and
  2-15% of $Li_2O$.

The present invention further provides a chemically strengthened glass having a base composition including, in mole percentage in terms of oxides:
  40-65% of $SiO_2$;
  25-40% of $Al_2O_3$;
  7-15% of $Y_2O_3$; and
  2-15% of $Li_2O$, and
  having a compressive stress value, measured at a depth of 50 µm from a surface thereof, of 150 MPa or more.

The present invention further provides a glass which is a silicate glass including 25% or more of $Al_2O_3$ in mole percentage in terms of oxides and includes one or more components selected from $Y_2O_3$, $La_2O_3$, $Nb_2O_5$, $Ta_2O_5$, and $WO_3$ in a total amount of 7% or more.

Advantageous Effects of Invention

The glass of the present invention is an $SiO_2$—$Al_2O_3$ glass containing a cation component having a small ionic radius in an amount within a specific range and, hence, has a high fracture toughness value and is less apt to devitrify. Furthermore, the glass of the present invention has higher strength than conventional glasses and a high CT limit and is hence an excellent glass for chemical strengthening.

DESCRIPTION OF EMBODIMENTS

Figure 1:
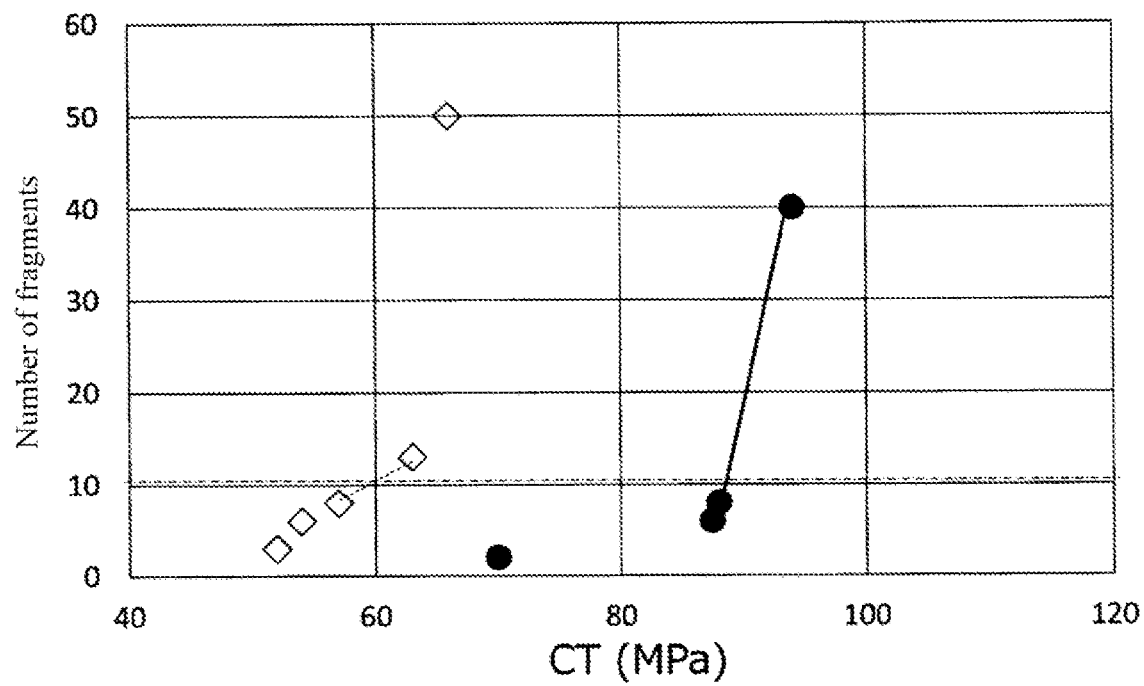
FIG. 1 is a diagram showing relationships between internal tensile stress value (CT) after chemical strengthening and the number of fragments in glasses A and B.

The glass for chemical strengthening of the present invention is described in detail below, but the present invention is not limited to the following embodiments and can be modified at will within the gist of the present invention.

In this description, the composition of each glass is expressed in mole percentage in terms of oxides, and "mol %" is often expressed simply by "%". Furthermore, "–" indicating a numerical range is used in the sense of including the numerical values set force before and after the "–" as a lower limit value and an upper limit value.

The expression "containing substantially no X" used for a glass composition means that the composition does not contain X except for unavoidable impurity which was contained in a raw material, etc., that is, X has not been incorporated on purpose. Specifically, the content thereof in the glass composition is, for example, less than 0.1 mol %.

In this description, the term "glass for chemical strengthening" means a glass which as not undergone a chemical strengthening treatment. The term "chemically strengthened glass" means a glass which has undergone a chemical strengthening treatment.

In this description, the glass composition of a glass for chemical strengthening is sometimes called the base composition of a chemically strengthened glass. In chemically strengthened glasses, a compressive stress layer has usually been formed in glass surface portions by ion exchange and, hence, the portions which have not undergone the ion exchange have a glass composition that is identical with the base composition of the chemically strengthened glass. With respect to the portions which have undergone the ion exchange, the concentrations of components other than alkali metal oxides are identical with those in the base composition.

In this description, "stress profile" is a pattern showing compressive stress values using the depth from a glass surface as a variable. Negative values of compressive stress mean tensile stress. "Depth of compressive stress layer (DOC)" is a depth at which the compressive stress value (CS) becomes zero. The term "internal tensile stress value (CT)" means a tensile stress value measured at a depth which is ½ the glass sheet thickness t.

The stress profile of a surface-layer portion in this description is determined using an optical-waveguide surface stress meter (e.g., FSM-6000, manufactured by Orihara Industrial Co., Ltd.). With an optical-waveguide surface stress meter, stress values of a glass sample can be measured without processing the glass sample, for example, processing into a thin section thereof. However, the optical-waveguide surface stress meter, because of the principle of measurement, is usable in stress measurements only when the refractive index decreases from the surface toward the inside. As a result, there is a problem in that the stress meter cannot be used for measuring the compressive stress of inner portions of a glass sheet obtained by chemically strengthening an aluminosilicate glass containing lithium.

Stress values of an inner portion of a glass sheet are measured using a scattered-light photoelastic stress meter (e.g., SLP-1000, manufactured by Orihara Industrial Co., Ltd.). With a scattered-light photoelastic stress meter, stress values of a glass sample can be measured regardless of a refractive-index distribution of the inner portion of the glass without processing the glass sample, for example, processing into a thin section thereof. The scattered-light photoelastic stress meter is apt to be affected by light scattered by the surface and it is hence difficult to precisely measure stress values of a portion near the glass surface. Because of this, with respect to surface-layer portions, stress values are measured with the optical-waveguide surface stress meter.

In this description, CT limit is a maximum value of CT at which the number of fragments determined in the following manner is 10 or less.

A plurality of test glass sheets differing in CT value are prepared by chemically strengthening 15-mm-square glass sheets having a thickness of 0.5 mm or more and 1 mm or less and having mirror-polished surfaces, under various conditions. CT values in this case can be measured with the scattered-light photoelastic stress meter.

Furthermore, the depth of compressive stress layer (DOC) is estimated. In cases when the DOC is too large for the thickness of the glass sheet, it is possible that the glass composition of the tensile stress layer is changed, making accurate evaluation of CT limit impossible. It is hence preferable that glass sheets having a DOC of 100 μm or less are used for CT limit evaluation.

A Vickers tester is used and a Vickers indenter having a tip angle of 90° is forced into the center of a test glass sheet to break the glass sheet; the number of fragments is counted. (In cases when the glass sheet was broken into two pieces, the number of fragments is 2.) In cases when exceedingly fine fragments have resulted, fragments which do not pass through a 1-mm sieve are counted and the number thereof is taken as the number of fragments.

However, in the case where the number of fragments exceeds 50, the number thereof may be taken as 50. The reasons for this are that in cases when the test has resulted in too many fragments, it is difficult to accurately count the fragments, for example, because most of the fragments pass through the sieve and that to regard the number of fragments as 50 actually exerts little influence on CT limit evaluation. The test is initiated with a Vickers indenter forcing load of 3 kgf, and the forcing load is increased by 1 kgf each time when the glass sheet has not broken. The test is thus repeated until the glass sheet breaks, and the number of fragments is counted after the first breakage.

The number of fragments is plotted against the CT value of the test glass sheet. The CT value of a point where the number of fragments is 10 is read as a CT limit.

FIG. 1 is a diagram showing plots of the number of fragments against CT value with respect to glass A and glass B, which differ in glass composition. The plot for glass A is shown by open rhombs, and the plot for glass B is shown by solid circles. It can be seen from FIG. 1 that in glasses having the same composition, the number of fragments increases as the CT increases. It can also be seen that the number of fragments, after having exceeded 10, abruptly increases with increasing CT.

A CT value at which the number of fragments is 10 is read as a CT limit from both a CT value at which the number of fragments is a largest possible value not larger than 10 and a CT value at which the number of fragments is a smallest possible value larger than 10. Here, the number of fragments which is a largest possible value not larger than 10 is 8 or more, preferably 9 or more. The number of fragments which is larger than 10 is 40 or less, more preferably 20 or less.

In Table 1 are shown the results of an examination of glass A (70.4% $SiO_2$, 13.0% $Al_2O_3$, 8.4% $Li_2O$, 5.3% $Na_2O$, 1.0% $K_2O$, 7.0% MgO, 0.2% CaO, 1.0% $ZrO_2$) and glass B (53.6% $SiO_2$, 32.1% $Al_2O_3$, 10.7% $Li_2O$, 3.6% $Y_2O_3$). With respect to glass A, the CT limit is deemed to be 60 MPa from the stress value of 57 MPa, at which the number of fragments was 8, and the stress value of 63 MPa, at which the number of fragments was 13. With respect to glass B, the CT limit is deemed to be 88 MPa from the stress value of 88 MPa, at which the number of fragments was 8, and the stress value of 94 MPa, at which the number of fragments was 40.

TABLE 1

|  | Stress | Number of fragments | CT limit |
|---|---|---|---|
| Glass A | 52 | 3 | 60 |
|  | 54 | 6 |  |
|  | 57 | 8 |  |
|  | 63 | 13 |  |
|  | 66 | 50 |  |
| Glass B | 70 | 2 | 88 |
|  | 87 | 6 |  |
|  | 88 | 8 |  |
|  | 94 | 40 |  |

In this description, the term "chemically strengthened glass" means a glass which has undergone a chemical strengthening treatment, and the term "glass for chemical strengthening" means a glass which has not undergone a chemical strengthening treatment.

In this description, the "base composition of a chemically strengthened glass" is the glass composition of the glass for chemical strengthening. In chemically strengthened glasses, the glass composition of a portion lying at a depth which is ½ the sheet thickness t is the same as the base composition of the chemically strengthened glass except for the case where an extreme ion exchange treatment has given thereto.

In this description, each glass composition is expressed in mole percentage in terms of oxides unless otherwise indicated, and "mol %" is expressed simply by "%".

In this description, the expression "containing substantially no X" means that the content of X is not higher than an impurity level contained in a raw material, etc., that is, X has not been incorporated on purpose. Specifically, the content thereof is, for example, less than 0.1 mol %.

<Glass>

The glass of the present invention preferably is a silicate glass including 25% or more of $Al_2O_3$ in mole percentage in terms of oxides and including one or more components selected from $Y_2O_3$, $La_2O_3$, $Nb_2O_5$, $Ta_2O_5$, and $WO_3$ in a total amount of 7% or more.

One embodiment of the glass of the present invention preferably includes, in mole percentage in terms of oxides:
40-65% of $SiO_2$;
25-40% of $Al_2O_3$; and
7-15% of one or more components, in total, selected from $Y_2O_3$, $La_2O_3$, $Nb_2O_5$, $Ta_2O_5$, and $WO_3$.

As stated in Patent Document 1, silicate glasses containing $Al_2O_3$ in a large amount, although having a high fracture toughness value, have a high devitrification temperature and have been difficult to produce stably.

The present inventors hence made investigations on a method of lowering the devitrification temperature of a glass having a high fracture toughness value to make the glass easy to produce. As a result, the inventors have discovered that it is effective to add an oxide of a cation having a high valence and a small ionic radius. Such a cation is hereinafter sometimes called a cation having a high field strength.

In cases when an oxide of a cation having a high field strength is added to an $SiO_2$—$Al_2O_3$ glass having a high $Al_2O_3$ content and when the addition amount thereof is small, this results in a decrease in fracture toughness value. This is thought to be because the coordination number of the aluminum ions has changed. However, adding such an oxide in a large amount improves the fracture toughness value. This is thought to be because the cations having a high field strength attract surrounding oxygen ions to thereby form a glass structure having a high packing density. In addition, oxides of cations having a high field strength are less apt to form crystals based on combinations with $SiO_2$ or $Al_2O_3$, and thus the devitrification temperature is decreased.

Examples of the oxide of a cation having a high field strength include $Y_2O_3$, $La_2O_3$, $Nb_2O_5$, $Ta_2O_5$, and $WO_3$.

The effects of cations having a high field strength can be ascertained by the following experiment on glasses containing $Y_2O_3$.

Figure 2:
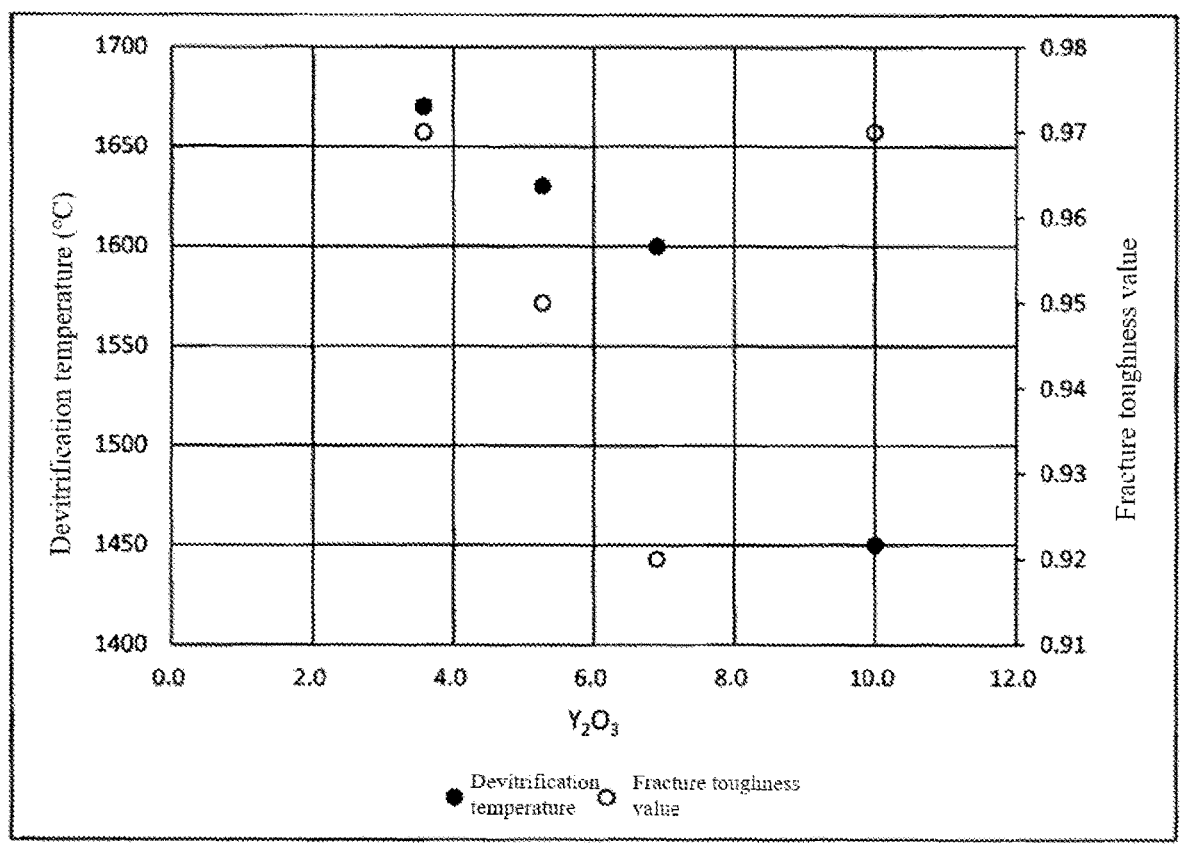
FIG. 2 is a diagram showing relationships between $Y_2O_3$ content and either devitrification temperature or fracture toughness value in glasses C to F.

Glasses C, D, E, and F shown in Table 2 are each a glass composed of four components, i.e., $SiO_2$, $Al_2O_3$, $Li_2O$, and $Y_2O_3$, and are equal in content ratio among $SiO_2$, $Al_2O_3$, and $Li_2O$ but differ in $Y_2O_3$ content. These glasses were examined for fracture toughness value and devitrification temperature. As a result, as FIG. 2 shows, there was a tendency that the higher the $Y_2O_3$ content, the lower the devitrification temperature, and a high fracture toughness value and a low devitrification temperature were obtained in cases when $Y_2O_3$ had been incorporated in amounts not smaller than a certain value.

TABLE 2

| mol % | Glass C | Glass D | Glass E | Glass F |
|---|---|---|---|---|
| $SiO_2$ | 53.6 | 52.6 | 51.7 | 50.0 |
| $Al_2O_3$ | 32.1 | 31.6 | 31.0 | 30.0 |
| $Y_2O_3$ | 3.6 | 5.3 | 6.9 | 10.0 |
| $Li_2O$ | 10.7 | 10.5 | 10.3 | 10.0 |
| Devitrification temperature | 1670 | 1630 | 1600 | 1450 |
| Fracture toughness value | 0.97 | 0.95 | 0.92 | 0.97 |

Investigations made by the present inventors have revealed that the effect of lowering the devitrification temperature is remarkably produced especially by $Y_2O_3$. The same effect is observed also with respect to $La_2O_3$, etc.

From the standpoint of the ease of production, the devitrification temperature of the glass of the present invention is preferably 1,500° C. or less, more preferably 1,480° C. or less, still more preferably 1,450° C. or less. The devitrification temperature thereof is typically 1,200° C. or more. Devitrification temperature can be determined, for example, by the method described in Examples.

In the case where the glass of the present invention has a sheet shape, the sheet thickness (t) thereof is, for example, 2 mm or less, preferably 1.5 mm or less, more preferably 1 mm or less, still more preferably 0.9 mm or less, especially preferably 0.8 mm or less, most preferably 0.7 mm or less. Meanwhile, from the standpoint of obtaining sufficient strength, the sheet thickness thereof is, for example, 0.1 mm or more, preferably 0.2 mm or more, more preferably 0.4 mm or more, still more preferably 0.5 mm or more.

The glass of the present invention preferably has a fracture toughness value of 0.9 $MPa \cdot m^{1/2}$ or more. Glasses having high fracture toughness values are less apt to break. Especially in the case where the glass of the present invention is to be chemically strengthened before being used, the glass having a high fracture toughness value has a high CT limit and is hence advantageous in that this glass, even after a thick surface compressive stress layer has been formed therein by the chemical strengthening, is less apt to be vigorously fractured. The fracture toughness value thereof is more preferably 0.93 MPa·m$^{1/2}$ or more, still more preferably 0.95 MPa·m$^{1/2}$ or more. The fracture toughness value thereof is usually 2.0 MPa·m$^{1/2}$ or less, typically 1.5 MPa·m$^{1/2}$ or less.

Fracture toughness value can be measured, for example, using a DCDC method (*Acta metall. mater.*, Vol. 43, pp. 3453-3458, 1995).

From the standpoint of improving the fracture toughness, the glass of the present invention has a Young's modulus of preferably 100 GPa or more, more preferably 102 GPa or more, still more preferably 105 GPa or more. From the standpoint of processability, the Young's modulus thereof is preferably 130 GPa or less, more preferably 120 GPa or less.

The glass of the present invention may be a glass for chemical strengthening. In the case where the glass of the present invention is a glass for chemical strengthening, this glass preferably is a lithium aluminosilicate glass. Since the lithium aluminosilicate glass contains lithium ions, which are the alkali ions having a smallest ionic radius, a chemically strengthened glass having a preferred stress profile is obtained therefrom by a chemical strengthening treatment in which ion exchange is conducted using any of various molten salts.

In the case where the glass of the present invention is a glass for chemical strengthening, the CT limit thereof is preferably 75 MPa or more, more preferably 78 MPa or more, still more preferably 80 MPa or more. The CT limit of the glass of the present invention is usually 95 MPa or less.

In the case where the glass of the present invention is used as a glass for chemical strengthening, a preferred embodiment thereof is a glass which includes, in mole percentage in terms of oxides:

40-65% of $SiO_2$;
25-40% of $Al_2O_3$;
7-15% of $Y_2O_3$; and
2-15% of $Li_2O$.

The composition of the glass of the present invention is explained below.

In the glass of the present invention, $SiO_2$ is a component which constitutes a glass network structure and which enhances chemical durability. From the standpoint of obtaining sufficient chemical durability, the content of $SiO_2$ is preferably 40% or more, more preferably 44% or more, still more preferably 48% or more.

Meanwhile, from the standpoint of increasing the strength of the glass, the content of $SiO_2$ is preferably 65% or less, more preferably 60% or less, still more preferably 55% or less.

$Al_2O_3$ is an essential component of the glass of the present invention and is a component which contributes to glass strength enhancement. From the standpoint of obtaining sufficient strength, the content of $Al_2O_3$ is preferably 20% or more, more preferably 22% or more, still more preferably 25% or more, yet still more preferably 28% or more, especially preferably 30% or more. From the standpoint of enhancing the meltability, the content of $Al_2O_3$ is preferably 40% or less, more preferably 37% or less, still more preferably 35% or less.

From the standpoint of lowering the devitrification temperature, it is preferable that the glass of the present invention contains one or more components selected from $Y_2O_3$, $La_2O_3$, $Nb_2O_5$, $Ta_2O_5$, and $WO_3$ in a total amount of 7% or more. The total content of these components is more preferably 8% or more, still more preferably 9% or more.

$Y_2O_3$, $La_2O_3$, $Nb_2O_5$, $Ta_2O_5$, and $WO_3$ are oxides of cations which are each the cation having a high field strength described above. These oxides have the effect of improving the Young's modulus and the fracture toughness value as stated above.

In case where the glass has too high a Young's modulus, this glass is difficult to process, sometimes resulting in a decrease in yield. From the standpoint of regulating the increase in Young's modulus to a value within an appropriate range, the total content of the one or more components selected from $Y_2O_3$, $La_2O_3$, $Nb_2O_5$, $Ta_2O_5$, and $WO_3$ is preferably 15% or less. The total content of these components is more preferably 13% or less, still more preferably 12% or less, especially preferably 11% or less.

In the glass composition of the present invention, the ratio ([$Y_2O_3$]+[$La_2O_3$]+[$Nb_2O_5$]+[$Ta_2O_5$]+[$WO_3$])/[$Al_2O_3$] of the total content of $Y_2O_3$, $La_2O_3$, $Nb_2O_5$, $Ta_2O_5$, and $WO_3$ to the content of $Al_2O_3$ is preferably 0.2 or more, more preferably 0.25 or more, still more preferably 0.3 or more, from the standpoint of forming a glass structure having a high packing density. From the standpoint of preventing the glass from having an unnecessarily high Young's modulus, ([$Y_2O_3$]+[$La_2O_3$]+[$Nb_2O_5$]+[$Ta_2O_5$]+[$WO_3$])/[$Al_2O_3$] is preferably 0.6 or less, more preferably 0.55 or less, still more preferably 0.5 or less.

From the standpoint of meltability, it is preferable that the glass of the present invention contains $Y_2O_3$. The content of $Y_2O_3$ is preferably 5% or more, more preferably 7% or more, still more preferably 8% or more. From the standpoint of preventing the glass from having an unnecessarily high Young's modulus, the content of $Y_2O_3$ is preferably 15% or less, more preferably 14% or less, still more preferably 13% or less, especially preferably 12% or less.

Although $La_2O_3$, $Nb_2O_5$, $Ta_2O_5$, and $WO_3$ are not essential components, these components have the effect of reducing the brittleness of the glass. Hence, these components may be incorporated in order to, for example, prevent chipping.

Alkali metal oxides such as $Li_2O$, $Na_2O$, and $K_2O$ (these oxides are sometimes referred to inclusively as "$R_2O$"), although not essential, are each a component which lowers the melting temperature of the glass. One or more of these may be contained.

From the standpoint of lowering the melting temperature, the total content of alkali metal oxides is preferably 2% or more, more preferably 4% or more, still more preferably 6% or more. From the standpoint of maintaining the strength of the glass, the content of $R_2O$ is preferably 15% or less, more preferably 14% or less, still more preferably 13% or less.

In the case where the glass of the present invention is to be chemically strengthened before use, the content of $Li_2O$ in the glass of the present invention is preferably 2% or more, more preferably 4% or more, still more preferably 6% or more, especially preferably 8% or more, from the standpoint of introducing sufficient compressive stress into the glass.

From the standpoint of inhibiting devitrification in producing the glass or in bending the glass, the content of $Li_2O$ is preferably 15% or less, more preferably 13% or less, still more preferably 12% or less.

$Na_2O$, although not essential, is a component for forming a surface compressive stress layer by ion exchange utilizing a molten salt including potassium and is also a component which improves the meltability of the glass. The content of $Na_2O$ is preferably 0.5% or more, more preferably 1% or more, still more preferably 1.5% or more. The content of $Na_2O$ is preferably 10% or less, more preferably 8% or less, still more preferably 6% or less.

$K_2O$, although not essential, may be incorporated in order to improve the meltability of the glass and inhibit devitrification. The content of $K_2O$ is preferably 0.5% or more, more preferably 1% or more. Meanwhile, from the standpoint of heightening the compressive stress value due to ion exchange, the content of $K_2O$ is preferably 5% or less, more preferably 3% or less, still more preferably 1% or less.

In the case where the glass of the present invention is for chemical strengthening, the ratio of the content of $Li_2O$ to the total content of alkali metal oxides, $[Li_2O]/[R_2O]$, is preferably 0.8 or more, more preferably 0.85 or more, from the standpoint of obtaining sufficient strength. $[Li_2O]/[R_2O]$ is 1 or less, and is more preferably 0.95 or less from the standpoint of facilitating melt in glass production.

Alkaline-earth metal oxides such as MgO, CaO, SrO, BaO, and ZnO are each a component which heightens the meltability of the glass but a component which deteriorates the brittleness. Because of this, the total content of MgO, CaO, SrO, BaO, and ZnO (MgO+CaO+SrO+BaO+ZnO) is preferably 15% or less, more preferably 10% or less, still more preferably 5% or less.

In the case where the glass of the present invention is subjected to chemical strengthening, alkaline-earth metal oxides tend to lower the rate of ion diffusion in the chemical strengthening. In this case, the total content of MgO, CaO, SrO, BaO, and ZnO (MgO+CaO+SrO+BaO+ZnO) is preferably 10% or less, more preferably 8% or less, still more preferably 5% or less.

MgO, among the alkaline-earth metal oxides, is not so causative of brittleness deterioration when contained, and tends to improve the Young's modulus. The content of MgO, when it is contained, is preferably 0.1% or more, more preferably 0.5% or more. The content of MgO is preferably 10% or less, more preferably 8% or less, still more preferably 5% or less. From the standpoint of heightening the ion exchange performance, the content of MgO is preferably 8% or less, more preferably 5% or less.

The content of CaO, when it is contained, is preferably 0.5% or more, more preferably 1% or more. Meanwhile, from the standpoint of diminishing brittleness deterioration, the content of CaO is preferably 5% or less, more preferably 3% or less. From the standpoint of heightening the ion exchange performance, the content of CaO is preferably 3% or less, more preferably 2% or less.

The content of SrO, when it is contained, is preferably 0.5% or more, more preferably 1% or more. Meanwhile, from the standpoint of diminishing brittleness deterioration, the content of SrO is preferably 3% or less, more preferably 2% or less. From the standpoint of heightening the ion exchange performance, the content of SrO is preferably 2% or less, more preferably 1.5% or less.

The content of BaO, when it is contained, is preferably 0.5% or more, more preferably 1% or more. Meanwhile, from the standpoint of diminishing brittleness deterioration, the content of BaO is preferably 3% or less, more preferably 2% or less. From the standpoint of heightening the ion exchange performance, the content of BaO is preferably 2% or less, more preferably 1.5% or less, and it is still more preferable that the glass composition contains substantially no BaO.

ZnO is a component which improves the meltability of the glass, and may be contained. The content of ZnO, when it is contained, is preferably 0.2% or more, more preferably 0.5% or more. From the standpoint of heightening the weather resistance of the glass, the content of ZnO is preferably 5% or less, more preferably 3% or less.

$B_2O_3$, although not essential, can be added in order to, for example, improve the meltability during glass production. In this case, the content thereof is preferably 1% or more, more preferably 2% or more, still more preferably 3% or more. Meanwhile, since $B_2O^3$ is a component which is prone to cause phase separation when contained in a large amount, the content of $B_2O_3$ is preferably 8% or less, more preferably 7% or less, still more preferably 6% or less.

$B_2O^3$ is a component which renders stress relaxation apt to occur after chemical strengthening. Because of this, from the standpoint of further heightening the surface compressive stress of the chemically strengthened glass, the content of $B_2O_3$ is preferably 8% or less, more preferably 7% or less, still more preferably 6% or less, most preferably 5% or less.

$P_2O_5$, although not essential, can be added in order to, for example, improve the meltability during glass production. $P_2O_5$ may be incorporated in order to improve the ion exchange performance. The content of $P_2O_5$, when it is contained, is preferably 0.5% or more, more preferably 1% or more. From the standpoint of heightening the chemical durability, the content of $P_2O_5$ is preferably 10% or less, more preferably 8% or less, still more preferably 5% or less.

$TiO_2$ tends to inhibit solarization and may be contained. The content of $TiO_2$, when it is contained, is preferably 0.1% or more. From the standpoint of inhibiting devitrification during melting, the content of $TiO_2$ is preferably 5% or less, more preferably 3% or less, still more preferably 1% or less, especially preferably 0.5% or less.

$ZrO_2$ tends to improve the weather resistance and may be contained. The content of $ZrO_2$, when it is contained, is preferably 0.5% or more, more preferably 1% or more. Meanwhile, from the standpoint of inhibiting devitrification during melting, the content of $ZrO_2$ is preferably 6% or less, more preferably 5% or less, still more preferably 4% or less.

The total content of $TiO_2$ and $ZrO_2$ ($TiO_2+ZrO_2$) is preferably 5% or less, more preferably 3% or less. ($TiO_2+ZrO_2$) is preferably 0.5% or more, more preferably 1% or more.

In the case of coloring the glass, coloring components may be added so long as the addition thereof does not adversely affect the attainment of desired properties. Examples of the coloring components include $Co_3O_4$, $MnO_2$, $Fe_2O_3$, $NiO$, $CuO$, $Cr_2O_3$, $V_2O_5$, $Bi_2O_3$, $SeO_2$, $CeO_2$, $Er_2O_3$, and $Nd_2O_3$. One of these may be used alone, or two or more thereof may be used in combination.

The content of such coloring components is preferably 7% or less in total. Thus, the glass can be inhibited from devitrifying. The content of the coloring components is more preferably 5% or less, still more preferably 3% or less, especially preferably 1% or less. In cases when the transparency of the glass is desired to be heightened, it is preferable that these components are substantially not contained.

$SO_3$, a chloride, a fluoride, etc. may be suitably contained as a refining agent for glass melting. It is preferable that substantially no $As_2O_3$ is contained. In cases when $Sb_2O_3$ is contained, the content thereof is preferably 0.3% or less, more preferably 0.1% or less. It is most preferable that substantially no $Sb_2O_3$ is contained.

The glass of the present invention has a liquidus temperature of preferably 1,600° C. or less, more preferably 1,550° C. or less. Such low liquidus temperatures make it possible to produce the glass without using a special method such as a container-less processing method.

The glass of the present invention preferably has a log η at 1,650° C. of 2 or less.

The glass of the present invention has a softening point of preferably 1,000° C. or less, more preferably 950° C. or less. This is because lower softening point of the glass results in not only lower heat treatment temperature and smaller energy consumption in performing bending, etc., but also smaller burden to the equipment. In case where the glass has too low a softening point, the stress to be introduced by a chemical strengthening treatment is prone to relax and the glass hence tends to come to have a low strength. Consequently, the softening point thereof is preferably 550° C. or more. The softening point thereof is more preferably 600° C. or more, still more preferably 650° C. or more.

Softening point can be measured by the fiber elongation method described in JIS R3103-1:2001.

The glass of the present invention can be produced by an ordinary method. For example, raw materials for the components of the glass are mixed and the mixture is heated and melted with a glass melting furnace. Thereafter, the glass is homogenized by a known method, formed into a desired shape, e.g., a glass sheet, and annealed.

Thereafter, the formed glass is ground and polished according to need to form a glass substrate. In the case where the glass substrate is cut into a given shape and size or where the glass substrate is chamfered, it is preferred to conduct the cutting or chamfering of the glass substrate before the chemical strengthening treatment which will be described later is given thereto. This is because a compressive stress layer is formed also in the end surfaces by the subsequent chemical strengthening treatment.

The glass of the present invention has a high fracture toughness value, is less apt to break, and is nevertheless easy to produce. This glass is hence useful as structural members, e.g., window glasses. Furthermore, since this glass has a high CT limit for chemical strengthening, it is an excellent glass for chemical strengthening.

<Chemically Strengthened Glass>

In the case where a chemically strengthened glass (hereinafter often referred to as "this strengthened glass") obtained by chemically strengthening the glass of the present invention has a sheet shape, the sheet thickness (t) thereof is, for example, 2 mm or less, preferably 1.5 mm or less, more preferably 1 mm or less, still more preferably 0.9 mm or less, especially preferably 0.8 mm or less, most preferably 0.7 mm or less. Meanwhile, from the standpoint of obtaining sufficient strength, the sheet thickness thereof is, for example, 0.1 mm or more, preferably 0.2 mm or more, more preferably 0.4 mm or more, still more preferably 0.5 mm or more.

In the case where the glass of the present invention is chemically strengthened, a chemical strengthening treatment can be conducted, for example, by immersing the glass sheet for 0.1-500 hours in a molten salt, e.g., potassium nitrate, heated at 360-600° C. The heating temperature of the molten salt is preferably 375-500° C., and the period of immersion of the glass sheet in the molten salt is preferably 0.3-200 hours.

Examples of the molten salt for conducting the chemical strengthening treatment include nitrates, sulfates, carbonates, and chlorides. Examples of the nitrates, among these, include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. One of these molten salts may be used alone, or two or more thereof may be used in combination.

Treatment conditions for the chemical strengthening treatment may be suitably selected while taking account of the composition (properties) of the glass, kind of the molten salt, desired properties to be imparted by the chemical strengthening, etc.

A chemical strengthening treatment may be conducted only once, or a plurality of chemical strengthening treatments (multistage strengthening) may be conducted under two or more different sets of conditions. For example, use may be made of a method in which a chemical strengthening treatment is conducted as a first-stage chemical strengthening treatment under such conditions as to result in a large ion exchange depth and a relatively low CS, and a chemical strengthening treatment is conducted thereafter as a second-stage chemical strengthening treatment under such conditions as to result in a relatively small ion exchange depth and a high CS. In this case, the chemically strengthened glass can have a heightened outermost-surface CS and be inhibited from having a large internal tensile stress area (St). As a result, the chemically strengthened glass can have a low CT.

The chemically strengthened glass (hereinafter often referred to as "this chemically strengthened glass") obtained from the glass of the present invention has a large compressive stress value ($CS_{50}$) measured at a depth of 50 μm from a surface of the glass. The $CS_{50}$ is preferably 150 MPa or more, more preferably 160 MPa or more, still more preferably 170 MPa or more. The $CS_{50}$ is usually 300 MPa or less.

In this chemically strengthened glass, the depth (DOC) at which the compressive stress value becomes 0 is preferably 70 μm or more. The DOC is more preferably 80 μm or more, still more preferably 90 μm or more. In case where the DOC is too large for the sheet thickness t, this results in an increase in CT. Consequently, the DOC is preferably t/4 or less, more preferably t/5 or less. Specifically, in cases when the sheet thickness t is, for example, 0.8 mm, the DOC is preferably 160 μm or less.

This chemically strengthened glass has a surface compressive stress value ($CS_0$) of preferably 500 MPa or more, more preferably 600 MPa or more, still more preferably 700 MPa or more. From the standpoint of preventing chipping due to impact, the $CS_0$ is preferably 1,000 MPa or less, more preferably 900 MPa or less.

In case where the CT of this chemically strengthened glass exceeds a CT limit, the glass is prone to be vigorously fractured. Therefore the CT thereof is preferably not higher than the CT limit. More preferably, the CT thereof is regulated to up to 0.95 times the CT limit.

CT is proportional to the sum of compressive stress and, hence, a CT which is high to some degree is necessary for strength enhancement. Because of this, the CT is preferably at least 0.7 times the CT limit. The CT is more preferably at least 0.75 times, more preferably at least 0.8 times, especially preferably at least 0.85 times the CT limit.

Surface compressive stress value ($CS_0$) can be measured with a surface stress meter utilizing photoelasticity (e.g., FSM-6000, manufactured by Orihara Industrial Co., Ltd.). However, in cases when, for example, the glass before the chemical strengthening had too low an Na content, the measurement with the surface stress meter is difficult.

In such cases, the magnitude of surface compressive stress value can sometimes be estimated from a measurement of bending strength. This is because there is a tendency that the larger the surface compressive stress value, the higher the bending strength.

The bending strength can be evaluated by performing a four-point bending test using a test piece in a strip form of 10 mm×50 mm under the conditions of a distance between outer support points of the support of 30 mm, a distance between inner support points thereof of 10 mm, and a crosshead speed of 0.5 mm/min. The number of test pieces is, for example, 10.

This chemically strengthened glass has a four-point bending strength of preferably 500 MPa or more, more preferably 600 MPa or more, still more preferably 700 MPa or more. The four-point bending strength of this chemically strengthened glass is usually 1,000 MPa or less, typically 900 MPa or less.

In this chemically strengthened glass, a sheet thickness-direction central portion has a glass composition which is the same as the glass composition of the glass of the present invention. This chemically strengthened glass as a whole basically has the same glass composition as the glass of the present invention, except for the concentrations of alkali metal ions which have changed due to the chemical strengthening treatment. Explanations thereon are hence omitted.

The glass of the present invention may have any of shapes other than sheet shapes, in accordance with products, uses, etc. to which the glass is applied. The glass sheet may have, for example, a trimmed shape in which the periphery has different thicknesses. Configurations of the glass sheet are not limited to these. For example, the two principal surfaces may not be parallel with each other, or some or all of one or each of the two principal surfaces may be a curved surface. More specifically, the glass sheet may be, for example, a flat glass sheet having no warpage or may be a curved glass sheet having curved surfaces.

The glass of the present invention, after having been chemically strengthened according to need, can be used as cover glasses for mobile electronic appliances such as portable telephones, smartphones, portable digital assistants (PDAs), and tablet terminals. The glass of the present invention is useful also as the cover glasses of electronic appliances not intended to be carried, such as televisions (TVs), personal computers (PCs), and touch panels. Furthermore, the glass of the present invention is useful as building materials, e.g., window glasses, table tops, interior trims for motor vehicles, airplanes, etc., and cover glasses for these.

Since the glass of the present invention can be formed into a shape other than the flat sheet shape by subjecting the glass to bending or shaping before or after chemical strengthening, this glass is useful also in applications such as housings having a curved shape.

EXAMPLES

The present invention is described below using Examples, but the present invention is not limited by the following Examples. G7 to G15 are Examples of the glass of the present invention, and G1 to G6 are Comparative Examples. S4 to S6 are Examples of this chemically strengthened glass, and S1 to S3 are Comparative Examples. With respect to the examination results in the tables, each blank indicates that the property was not determined.

(Preparation of Glasses)

Raw materials for glass were mixed so as to result in each of the glass compositions shown in Tables 3 and 4 in mole percentage in terms of oxides, and the mixtures were melted and polished to prepare glass sheets. G1 is the glass A described hereinabove. X in the tables indicates the total content of $Y_2O_3$, $La_2O_3$, $Nb_2O_5$, $Ta_2O_5$, and $WO_3$.

The raw materials for glass were suitably selected from general raw materials for glass such as oxides, hydroxides, and carbonates, and weighed out so as to result in 900 g each of glasses.

Each mixture of raw materials for glass was put in a platinum crucible and melted and degassed at 1,700° C. The resultant glass was poured onto a carbon board to obtain a glass block, which was polished to obtain a sheet-shaped glass having a sheet thickness of 0.8 mm.

(Devitrification Temperature)

Some of the glass was pulverized, and the glass particles were put on platinum dishes and heat-treated for 17 hours in electric ovens regulated so as to have constant temperatures in the range of 1,000-1,700° C. The heat-treated glass was examined for devitrification with a polarizing microscope. Thus, a devitrification temperature was estimated.

(Fracture Toughness Value)

Fracture toughness value was determined by preparing a sample of 6.5 mm×6.5 mm×65 mm and examining the sample by the DCDC method. In this examination, a through hole having a diameter of 2 mm was formed in 65 mm×6.5 mm surfaces of the sample before the sample was evaluated.

(Young's Modulus)

Young's modulus was measured by an ultrasonic wave method.

(Bending Strength)

Bending strength was evaluated by the four-point bending test method.

(CT Limit)

The obtained sheet-shaped glasses were examined for CT limit by the method described above. Specifically, the sheet-shaped glasses were chemically strengthened using $NaNO_3$ salt and $KNO_3$ salt under various conditions, and the obtained chemically strengthened glasses were examined for CT using a scattered-light photoelastic stress meter (SLP-1000, manufactured by Orihara Industrial Co., Ltd.). Thereafter, a Vickers indenter was forced into the chemically strengthened glass sheets differing in CT value to examine these glass sheets for the number of fragments. Thus, the glass sheets were evaluated for CT limit.

However, since G10 to G12 were glasses containing no alkali metal oxides and incapable of chemical strengthening, these glasses were not examined for CT limit.

TABLE 3

| mol % | G1 | G2 | G3 | G4 | G5 | G6 | G7 |
|---|---|---|---|---|---|---|---|
| $SiO_2$ | 70.0 | 70.4 | 50.8 | 50.8 | 56.5 | 59.9 | 50.0 |
| $Al_2O_3$ | 7.5 | 13.0 | 30.5 | 30.5 | 28.3 | 24.0 | 30.0 |
| $B_2O_3$ | 0.0 | 1.8 | 0.0 | 5.1 | 0.0 | 0.0 | 0.0 |
| $P_2O_5$ | 0.0 | 0.0 | 5.1 | 0.0 | 0.0 | 0.0 | 0.0 |
| $Y_2O_3$ | 0.0 | 0.0 | 3.4 | 3.4 | 3.8 | 4.0 | 10.0 |
| $La_2O_3$ | 0.0 | 0.0 | 0.0 | 0.0 | 0.0 | 0.0 | 0.0 |

TABLE 3-continued

| mol % | G1 | G2 | G3 | G4 | G5 | G6 | G7 |
|---|---|---|---|---|---|---|---|
| $Nb_2O_5$ | 0.0 | 0.0 | 0.0 | 0.0 | 0.0 | 0.0 | 0.0 |
| $Ta_2O_5$ | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 |
| $Li_2O$ | 8.0 | 8.4 | 10.2 | 10.2 | 11.3 | 12.0 | 10.0 |
| $Na_2O$ | 5.3 | 2.4 | 0.0 | 0.0 | 0.0 | 0.0 | 0.0 |
| $K_2O$ | 1.0 | 0.0 | 0.0 | 0.0 | 0.0 | 0.0 | 0.0 |
| MgO | 7.0 | 2.8 | 0.0 | 0.0 | 0.0 | 0.0 | 0.0 |
| ZnO | 0.0 | 0.9 | 0.0 | 0.0 | 0.0 | 0.0 | 0.0 |
| CaO | 0.2 | 0.0 | 0.0 | 0.0 | 0.0 | 0.0 | 0.0 |
| $ZrO_2$ | 1.0 | 0.0 | 0.0 | 0.0 | 0.0 | 0.0 | 0.0 |
| X | 0.0 | 0.0 | 3.4 | 3.4 | 3.8 | 4.0 | 10.0 |
| $X/Al_2O_3$ | 0.0 | 0.0 | 0.1 | 0.1 | 0.1 | 0.2 | 0.3 |
| Devitrification temperature (° C.) | 1100 | 1300 | 1550 | 1600 | 1500 | 1200 | 1450 |
| Fracture toughness value (MPa · $m^{1/2}$) | 0.80 | 0.81 | 0.94 | 0.93 | 0.92 | 0.85 | 0.97 |
| Young's modulus (GPa) | 83 | 83 | 97 | 100 | 98 | 90 | 117 |
| Bending strength (MPa) | 194 | 204 | 233 | 235 | 224 | 232 | 246 |
| CT limit (MPa) | 57 | 60 | 80 | 84 | 83 | 68 | 89 |

TABLE 4

| mol % | G8 | G9 | G10 | G11 | G12 | G13 | G14 | G15 |
|---|---|---|---|---|---|---|---|---|
| $SiO_2$ | 60.4 | 50.0 | 55.0 | 50.0 | 55.0 | 45.0 | 50.0 | 50.0 |
| $Al_2O_3$ | 25.9 | 27.3 | 35.0 | 40.0 | 35.0 | 30.0 | 25.0 | 35.0 |
| $B_2O_3$ | 0.0 | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 | 0.0 |
| $Y_2O_3$ | 9.1 | 9.1 | 10.0 | 10.0 | 8.0 | 10.0 | 15.0 | 5.0 |
| $La_2O_3$ | 0.0 | 0.0 | 0.0 | 0.0 | 0.0 | 0.0 | 0.0 | 3.0 |
| $Nb_2O_5$ | 0.0 | 0.0 | 0.0 | 0.0 | 0.0 | 0.0 | 0.0 | 0.0 |
| $Ta_2O_5$ | 0.0 | 0.0 | 0.0 | 0.0 | 0.0 | 0.0 | 0.0 | 0.0 |
| $WO_3$ | 0.0 | 0.0 | 0.0 | 0.0 | 0.0 | 0.0 | 0.0 | 0.0 |
| $Li_2O$ | 4.5 | 13.6 | 0.0 | 0.0 | 2.0 | 15.0 | 10.0 | 10.0 |
| $Na_2O$ | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 |
| MgO | 0.0 | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 | 0.0 |
| $ZrO_2$ | 0.0 | 0.0 | 0.0 | 0.0 | 0.0 | 0.0 | 0.0 | 0.0 |
| X | 9.1 | 9.1 | 10.0 | 10.0 | 8.0 | 10.0 | 15.0 | 8.0 |
| $X/Al_2O_3$ | 0.4 | 0.3 | 0.3 | 0.3 | 0.2 | 0.3 | 0.6 | 0.2 |
| Devitrification temperature (° C.) | 1425 | 1350 | 1450 | 1490 | 1490 | 1420 | 1400 | 1440 |
| Fracture toughness value (MPa · $m^{1/2}$) | 0.99 | 0.94 | 1.03 | 1.06 | 1.04 | 0.97 | 1.00 | 1.02 |
| Young's modulus (GPa) | 111.0 | 111.9 | 117 | 120 | 113 | 106 | 112 | 112 |
| Bending strength (MPa) | 253 | 238 | 270 | 272 | 264 | 253 | 224 | 232 |
| CT limit (MPa) | 93 | 86 | — | — | — | 87 | 91 | 97 |

(Chemical Strengthening Treatment)

Glass sheets G1, G2, and G7 to G9 (size: 15 mm×15 mm×0.8 mm) were chemically strengthened to obtain chemically strengthened glasses (S1 to S6). The chemical strengthening treatment was conducted by a method in which each glass sheet was first immersed in $NaNO_3$ salt under the temperature and period conditions shown in the $NaNO_3$ treatment section in Table 5 and then immersed in $KNO_3$ salt under the temperature and period conditions shown in the $KNO_3$ treatment section. The obtained chemically strengthened glasses were examined for stress profile using SLP-1000. Furthermore, these glasses were examined for bending strength by the four-point bending method. The results thereof are shown in Table 5.

TABLE 5

| | S1 | S2 | S3 | S4 | S5 | S6 |
|---|---|---|---|---|---|---|
| Glass | G1 | G1 | G2 | G7 | G8 | G9 |
| Sheet thickness (mm) | 0.8 | 0.8 | 0.8 | 0.8 | 0.8 | 0.8 |
| (1) $NaNO_3$ treatment | 450° C. 2 hr | 450° C. 4 hr | 450° C. 1 hr | 450° C. 72 hr | 450° C. 48 hr | 450° C. 24 hr |
| (2) $KNO_3$ treatment | 425° C. 1 hr | 415° C. 2.5 hr | 450° C. 2 hr | 450° C. 12 hr | 450° C. 6 hr | 450° C. 6 hr |
| DOC (μm) | 129 | 158 | 191 | 81 | 92 | 112 |
| $CS_0$ (MPa) | 860 | 909 | 1033 | 237 | 274 | 250 |
| $CS_{50}$ (MPa) | 84 | 98 | 74 | 180 | 173 | 186 |
| Bending strength (MPa) | 847 | 879 | 1010 | 823 | 760 | 842 |

As Tables 3 and 4 show, the glasses of the present invention each combined high fracture toughness and a low devitrification temperature. It was further found that the glasses obtained by chemically strengthening some of the glasses of the present invention shown in Tables 3 and 4 each had a higher CT limit than the Comparative Examples and, hence, were able to be chemically strengthened so as to have a high compressive stress of 150 MPa or above measured in a position having a depth of 50 μm as shown in Table 5.

While the present invention has been described in detail and with reference to specific embodiments thereof, it will be apparent to one skilled in the art that various changes and modifications can be made therein without departing from the spirit and scope thereof.

The invention claimed is:

1. A glass comprising, in mole percentage in terms of oxides:
   44-65% of $SiO_2$;
   25-40% of $Al_2O_3$;
   0-6% of $Na_2O$;
   8-15% of $Y_2O_3$;
   5% or less of MgO;
   5% or less of CaO;
   2% or more of $Li_2O$; and
   8-15% of one or more components, in total, selected from $Y_2O_3$, $La_2O_3$, $Nb_2O_5$, $Ta_2O_5$, and $WO_3$.

2. The glass according to claim 1, comprising, in mole percentage in terms of oxides, 8-12% of $Y_2O_3$.

3. The glass according to claim 1, having, in mole percentage in terms of oxides, a ratio $([Y_2O_3]+[La_2O_3]+[Nb_2O_5]+[Ta_2O_5]+[WO_3])/[Al_2O_3]$ of the total content of $Y_2O_3$, $La_2O_3$, $Nb_2O_5$, $Ta_2O_5$, and $WO_3$ to the content of $Al_2O_3$ of 0.25-0.55.

4. The glass according to claim 1, comprising 2-15% of $Li_2O$.

5. The glass according to claim 1, having a fracture toughness value of 0.93 $MPa \cdot m^{1/2}$ or more.

6. The glass according to claim 1, having a devitrification temperature of 1,500° C. or less.

7. A method of manufacturing a chemically strengthened glass, the method comprising chemically strengthening a glass for chemical strengthening comprising, in mole percentage in terms of oxides:
   44-65% of $SiO_2$;
   25-40% of $Al_2O_3$;
   8-15% of $Y_2O_3$;
   5% or less of MgO;
   5% or less of CaO;
   2-15% of $Li_2O$; and
   0-6% of $Na_2O$.

8. The method of manufacturing a chemically strengthened glass according to claim 7, wherein the glass for chemical strengthening has a fracture toughness value of 0.93 $MPa \cdot m^{1/2}$ or more.

9. A chemically strengthened glass having a base composition comprising, in mole percentage in terms of oxides:
   44-65% of $SiO_2$;
   25-40% of $Al_2O_3$;
   8-15% of $Y_2O_3$;
   5% or less of MgO;
   5% or less of CaO;
   2-15% of $Li_2O$; and
   0-6% of $Na_2O$, and
   having a compressive stress value, measured at a depth of 50 μm from a surface thereof, of 150 MPa or more.

* * * * *